United States Patent
Yow, Jr. et al.

(10) Patent No.: US 6,775,458 B2
(45) Date of Patent: Aug. 10, 2004

(54) FIXTURE FOR A FLEXIBLE SHUFFLE CIRCUIT

(75) Inventors: Charles A. Yow, Jr., Ft. Worth, TX (US); Michael de Jong, Ft. Worth, TX (US); Stuart R. Melton, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/226,045

(22) Filed: Aug. 22, 2002

(65) Prior Publication Data

US 2004/0037534 A1 Feb. 26, 2004

(51) Int. Cl.[7] ................................................ G02B 6/00
(52) U.S. Cl. ...................................................... 385/137
(58) Field of Search .................................. 385/134–137

(56) References Cited

U.S. PATENT DOCUMENTS

| | | | |
|---|---|---|---|
| 5,674,097 A | * 10/1997 | McCleerey | ................ 439/863 |
| 5,758,004 A | * 5/1998 | Alarcon et al. | ............. 385/135 |
| RE37,028 E | 1/2001 | Cooke et al. | ................ 385/112 |
| 6,222,976 B1 | 4/2001 | Shahid | ........................ 385/134 |
| 6,259,851 B1 | * 7/2001 | Daoud | ........................ 385/135 |
| 6,351,590 B1 | 2/2002 | Shahid | ........................ 385/134 |
| 6,381,396 B1 | 4/2002 | Grois et al. | ................ 385/137 |

OTHER PUBLICATIONS

Schott Glass Made of Ideas; "Optical Shuffle"; Aug. 14, 2002, pp. 1–2.

Optical CrossLinks; "OC ShuffleLink™Products"; Aug. 15, 2002, pp. 1–2.

* cited by examiner

*Primary Examiner*—Khiem Nguyen (57) ABSTRACT

A fixture for routing fibers to be used in a flexible fiber management solution for optical networking applications. The fixture includes first and second sides with a central region therebetween. Each of the sides has a plurality of passageways to allow optical fibers to be routed and an orientation of the optical fibers to be maintained. The central region also has a passageway in communication with the first and second sides.

13 Claims, 9 Drawing Sheets

FIXTURE FOR A FLEXIBLE SHUFFLE CIRCUIT

The present invention relates to a flexible shuffle circuit and fixture, and more particularly, a shuffle circuit that provides a flexible fiber routing management solution for optical networking applications, a method, and a fixture for assembling the same.

There are several prior art systems including, for example, a device disclosed in U.S. Pat. No. 6,351,590, which discloses an optical harness and method for an optical cross-connect. The optical harness in this patent comprises a number of a fiber optic rows where each fiber optic cable comprises an array of optical fibers arranged in a plane. However, the optical fibers are in a ribbon arrangement, thereby limiting the flexibility of the optical fibers in each of the cables due to the bend radius of the optical fibers. Moreover, each of the fibers in the outgoing legs are all the same color, so when the cables become twisted and inverted, is difficult to identify the optical fibers.

Similarly, U.S. Pat. No. 6,381,396 discloses an optical fiber interconnection apparatus that includes a flexible body member having a peripheral edge. A plurality of optical fibers are mounted to the body member so that their ends extend beyond the peripheral edge. The flat flexible body member is a flexible polymer sheet, such as that of a polyamide material. Again, the flexibility of the optical fibers is restricted due to the optical fibers being mounted on the body member.

Still other prior art systems use a label attached to the optical fibers near their ends. The labels typically have a number identifying each set of optical fibers and which side contains the first fiber. However, oftentimes these labels fall off or, because the fiber lengths are too long, they are cut off to achieve the correct fiber lengths. The operator then has a problem identifying the sets and the first fiber, except through the costly and time-consuming procedure of trial and error.

Accordingly, the present invention is directed to a flexible shuffle circuit that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a flexible shuffle circuit that has a shuffle housing disposed on a plurality of optical fibers, the plurality of optical fibers extending from a first location in the shuffle housing, the plurality of optical fibers arranged into a first plurality of sets of optical fibers, each set of optical fibers in the first plurality of optical fibers comprising at least two optical fibers, and a protective covering on at least a portion of each of the first plurality of sets of optical fibers, the optical fibers being free to move relative to one another within the protective covering, and at least a portion of the protective coverings disposed within the shuffle housing at the first location, and the plurality of optical fibers extending from a second location in the shuffle housing, the plurality of optical fibers arranged into a second plurality of sets of optical fibers, the optical fibers in each of the second plurality of sets of optical fibers being different from the optical fibers in each of the first plurality of sets of optical fibers and each set of optical fibers in the second plurality of optical fibers comprising at least two optical fibers, and a protective covering on at least a portion of each of the second plurality of sets of optical fibers, the optical fibers being free to move relative to one another within the protective covering, and at least a portion of the protective coverings disposed within the shuffle housing at the second location.

In another aspect, the invention provides for a method of assembling a flexible shuffle circuit that includes providing a plurality of optical fibers having a first end and a second end, arranging the plurality of optical fibers into a first plurality of sets of optical fibers at the first end and a second plurality of sets of optical fibers at the second end, each set of optical fibers comprising at least two optical fibers, disposing a holding member on the plurality of optical fibers at a predetermined location, ribbonizing the ends of each of the first plurality of sets of optical fibers in a first predetermined orientation, and ribbonizing the ends of the second plurality of sets of optical fibers in a second predetermined orientation.

In yet another aspect, the invention is directed to a flexible shuffle circuit that includes a holding member, a first plurality of sets of optical fibers extending from a first location in the holding member, each optical fiber in each of the first plurality of sets of optical fibers having identifying indicia, the identifying indicia for each optical fiber in each set of the first plurality of sets being different, the optical fibers in the first plurality of sets of optical fibers having an end portion, the end portion of the optical fibers having a predetermined orientation based on the identifying indicia and the predetermined orientation of the ends of the optical fibers in each of the sets in the first plurality of sets of optical fibers being different, and a second plurality of sets of optical fibers extending from a second location in the holding member, each optical fiber in each of the second plurality of sets of optical fibers having identifying indicia, the identifying indicia for each optical fiber in each set of the second plurality of sets being different, the optical fibers in the second plurality of sets of optical fibers having an end portion, the end portion of the optical fibers having a predetermined orientation based on the identifying indicia and the predetermined orientation of the ends of the optical fibers in each of the sets in the second plurality of sets of optical fibers being different.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figure 1:
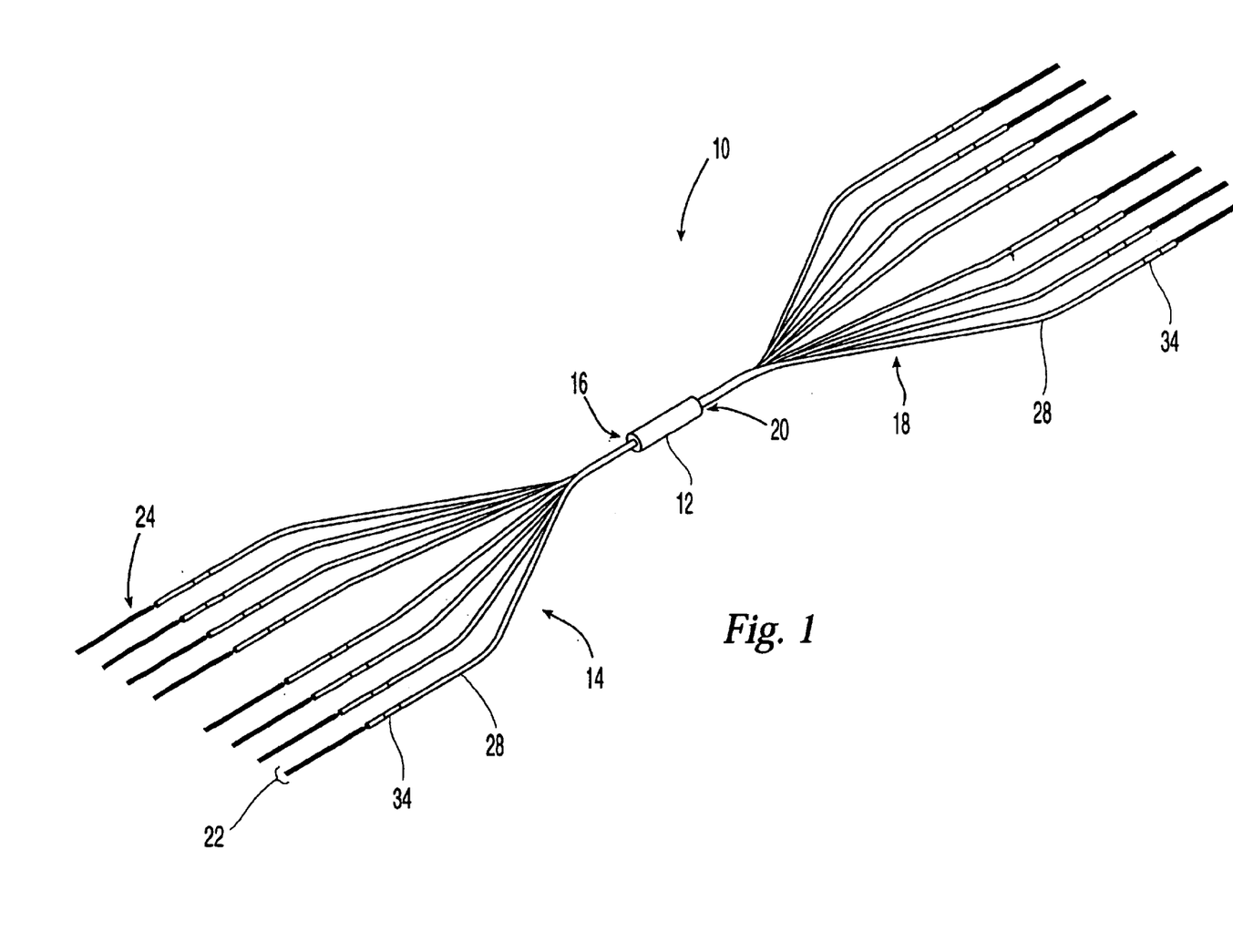
FIG. 1 is a perspective view of a flexible shuffle circuit according to one embodiment of the present invention.

FIG. 1 illustrates one embodiment of a flexible shuffle circuit 10 according to the present invention. Preferably, the flexible shuffle circuit 10 has a holding member, for example, a housing 12 with a plurality of sets 14 of optical fibers extending from a first location 16 of the housing 12 and a plurality of sets 18 of optical fibers extending from a second location 20 of the housing 12. Each of the sets 14,18 have a plurality of optical fibers 22 comprising a composite of non-ribbonized and ribbonized optical fibers. As can be best seen in FIG. 2, at least one but preferably each of the sets of optical fibers have end portions 24 that are preferably ribbonized, and, as discussed below in more detail, are ribbonized in a predetermined order. Similarly, at least one but preferably all of the ribbonized end portions 24 are connectorized with connectors 26. Although MTP connectors are illustrated in FIG. 2, any appropriate connector may be used, including, but not limited to, MPX, MT-RJ, LC, and SC.

Figure 2:
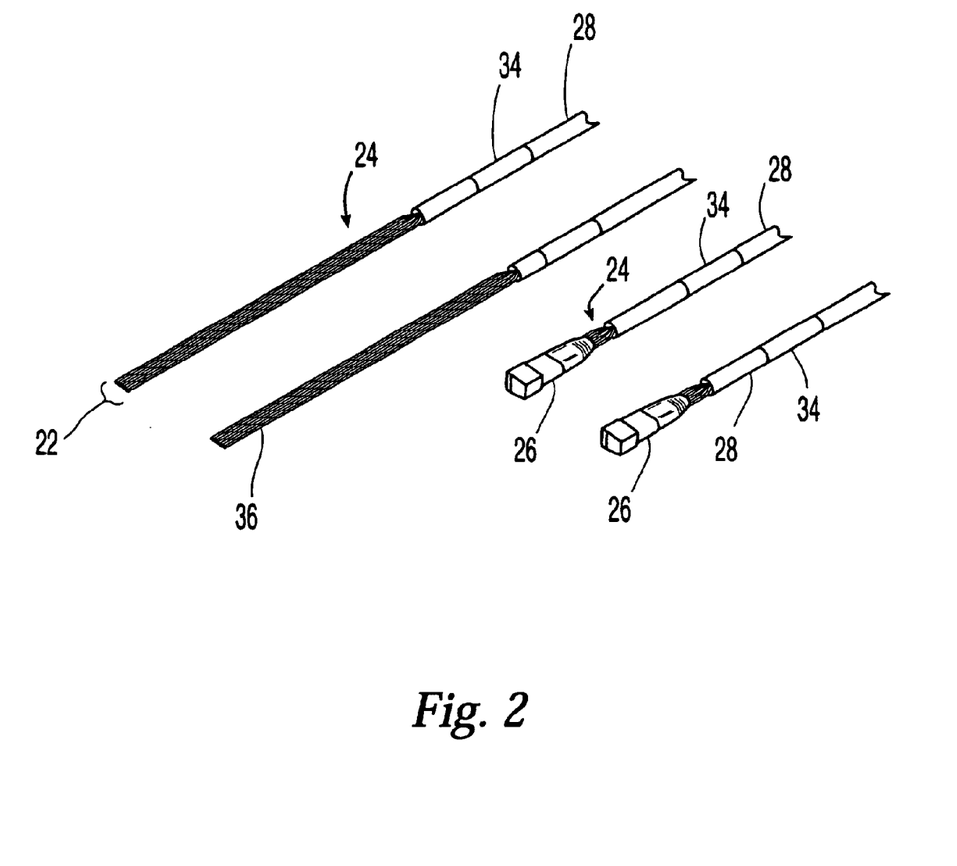
FIG. 2 is a detailed view of the some of the end portion of optical fibers in the flexible shuffle circuit of FIG. 1.

As can be seen in FIGS. 1 & 2, at least one but preferably each of the sets of optical fibers are preferably covered with a protective covering 28. The non-ribbonized portions of optical fibers 22 are preferably loose 250 micron optical fibers, so they are freely movable relative to one another between the housing 12 and the ribbonized end portions 24 within the protective coverings 28. In a preferred embodiment, only the end portions of the optical fibers 22 in each of sets 14, 16 are ribbonized, allowing each of the sets of optical fibers to be flexible in any direction or plane. While 250 micron loose fibers are illustrated, the optical fibers 22 can be of any size and/or configuration.

Figure 3:
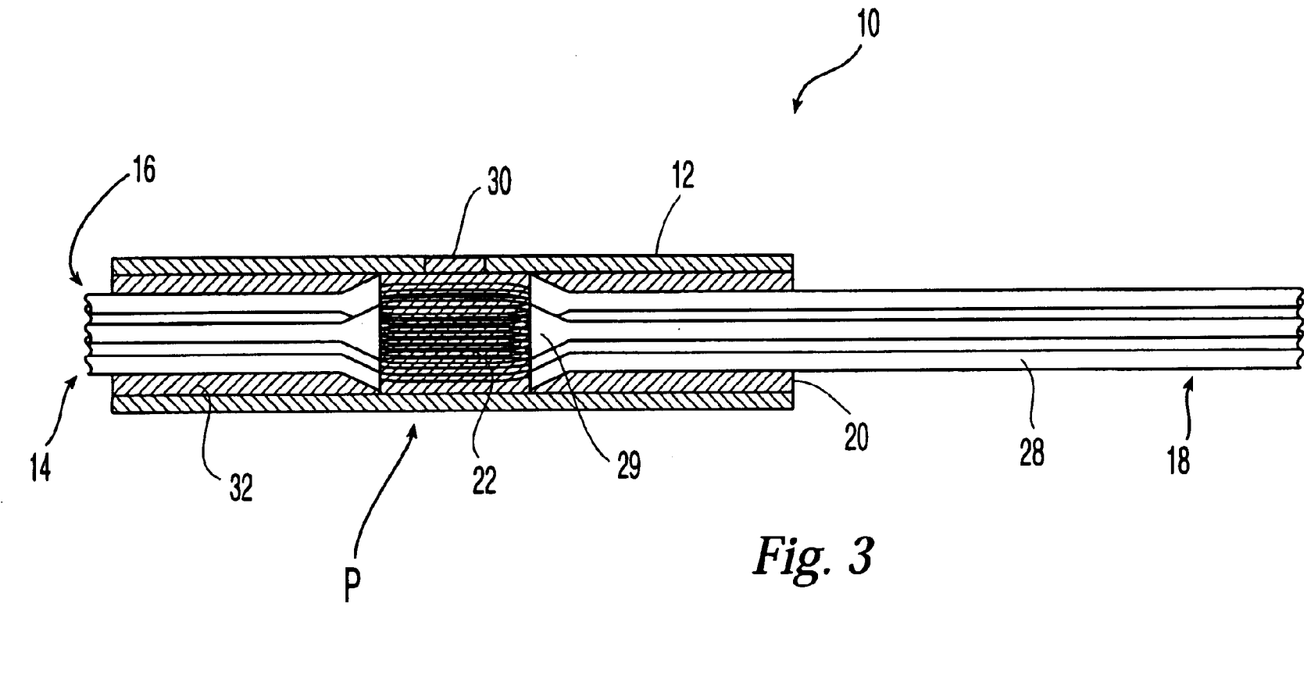
FIG. 3 is a partial cross section of a portion of the flexible shuffle circuit in FIG. 1.

An 8×8 flexible shuffle circuit is shown in the exemplarly embodiments shown in FIGS. 1–3. The flexible shuffle circuit has, for example, eight sets of optical fibers with eight optical fibers in each set. However, the present invention is not so limited. In fact, the present invention is directed to any flexible shuffle circuit having at least two sets of optical fibers and at least two optical fibers in each set. For example, the present invention is also directed to the flexible shuffle circuit depicted in FIG. 5, which illustrates a 4×4 flexible shuffle circuit. This flexible shuffle circuit is described in greater detail below. However, other combinations are also possible as long as the product of the number of sets of optical fibers and the number of fibers in each set is the same on an input side and an output side. The invention also contemplates the use of dark or dummy optical fibers to maintain positions and to fill microholes in a ferrule. Similarly, while the sets each extend from the housing 12 at two locations, three, four, or more locations are also within the scope of the present invention. Thus, the sets 14,18 of the optical fibers could extend from the housing at two or more locations.

As seen in FIGS. 1 and 3, housing 12 protects the optical fibers at the point of shuffling P. In one embodiment, illustrated best in FIG. 3, housing 12 is an elongated sleeve, for example, a cylindrical sleeve. In a preferred embodiment, housing 12 is a metal cylinder having at least one aperture 30. Aperture 30 provides access to the interior of housing 12 to allow the introduction of a suitable holding material 32 to secure the optical fibers 22 and ends of the protective coverings 28 within the housing 12. Preferably one end of protective coverings 28 has a fluted end 29 to allow for easy introduction of the optical fibers 22 into the protective coverings 28 as well as providing a structure for the holding material 32 to assist in maintaining the protective coverings 28 within the housing 12.

Figure 4:
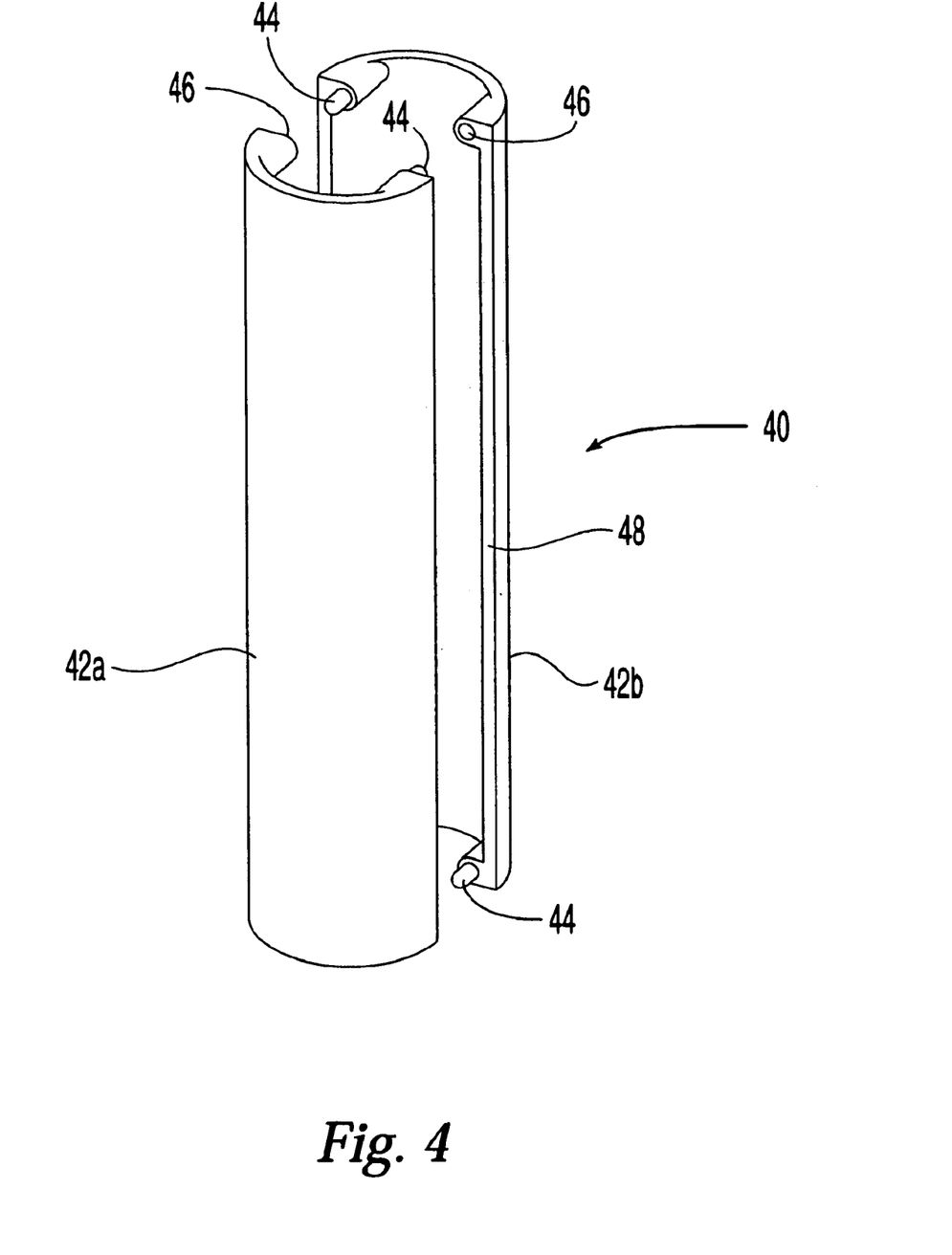
FIG. 4 illustrates an alternative embodiment of a shuffle housing according to a second embodiment of the present invention.

An alternative embodiment of a housing is illustrated in FIG. 4. The housing 40 a multi-piece housing, for example, a two-piece housing, which is illustrated in FIG. 4 as having two separate pieces 42a,42b. Housing 40 also has cooperating structures 44,46 to align the two pieces 42a,42b. While a projection 44 and a depression or hole 46 with a corresponding configuration are shown on opposing corners of housing 40, a tongue and groove running along a portion of the edge 48 or the entire length of the edge 48 of the housing or other structure could also be used. Alternatively, housing 40 may be a unitary piece with, for example, a hinge along one edge 48 with a clasp or other structure along the opposing edge to keep the housing closed. Similarly, housing 40 may also include an aperture (not shown) as in the first embodiment to allow introduction of a holding material to secure the optical fibers 22.

In another embodiment, housings 12 or 40 may also be a removable mold to allow the holding material 32 to form around the point of shuffling P. After the holding material 32 sets, cures, or hardens, the mold or housing can be removed. The holding material then remains and maintains the optical fibers 22 and the protective coverings 28 in an essentially fixed relationship. The holding material 32 is preferably an epoxy, but any suitable material can be used. For example, a silicone rubber material or a UV-curable material can also be used. However, if a UV curable material is used, then the housing must be transparent to UV light. A suitable holding material 32 must also be chosen depending on whether the housing 12 will be used as a housing or a mold.

The first sets of optical fibers 14 and the second sets of optical fibers 18 are shown in FIG. 1 to be about the same length; however, the length of the optical fibers in each of the sets or even within the sets may be of different lengths. The sets of optical fibers extending from one location may be directly connectorized or otherwise terminated as close to housing 12 or 40 as required to eliminate extra lengths of optical fibers if needed. As also shown in the embodiment in FIG. 1, the protective coverings 28 extend from the housing 12 to the end portions of the optical fibers 22 and close to the connectors 26. However, the protective coverings 28 may cover only a portion of the optical fibers 22 or they be eliminated in their entirety, as dictated by the use of the flexible shuffle circuit. For example, the flexible shuffle circuit may be short or the optical fibers may be in a protected environment making the protective sheaths unnecessary or undesirable.

As best shown in FIGS. 1 and 2, protective coverings 28 preferably have an identifying indicia 34. In a preferred embodiment, the identifying indicia 34 of the protective covering 28 is a colored marking, such as a piece of colored tape wrapped around the protective covering or a colored ring. Similarly, each of the optical fibers 22 has an identifying indicia 36, which is preferably an ink coating/layer.

The identifying indicia 34, 36 are preferably the same colors that are typically used to color optical fibers. As is known in the art, optical fibers in an optical fiber cable are colored to allow for differentiation and, in an optical ribbon, the optical fibers are secured in a predetermined sequence according to the colors. The standard sequence for the colors is as follows:

| Fiber | Color |
|---|---|
| 1 | Blue |
| 2 | Orange |
| 3 | Green |
| 4 | Brown |
| 5 | Slate |
| 6 | White |
| 7 | Red |
| 8 | Black |
| 9 | Yellow |
| 10 | Violet |
| 11 | Rose |
| 12 | Aqua |

Similarly, other indicia could be used if needed. For example, other colors, a series of distinctive rings, dots, dashes, etc. could be used rather than or in addition to the standard colors. The indicia would need to be repeated at a sufficient frequency to be able to identify the fibers if the protective covering indicia is removed.

If, as shown in FIGS. 1–3, each set of optical fibers has a protective covering that runs the length of the optical fibers, an identifying indicia 34 on the protective coverings 28 can also be used to identify the sets of optical fibers. In a preferred embodiment, the color of the identifying indicia 34 of the protective coverings 28 would correspond to the identifying indicia of the first fiber in the set. For example, the identifying indicia 34 of the protective coverings 28 in the first set of optical fibers would be blue, and the seventh red. It is also possible for the protective coverings to be made from a corresponding colored material. For example, the protective coverings 28 could be a colorized PTFE (Teflon®) sheath.

Figure 5:
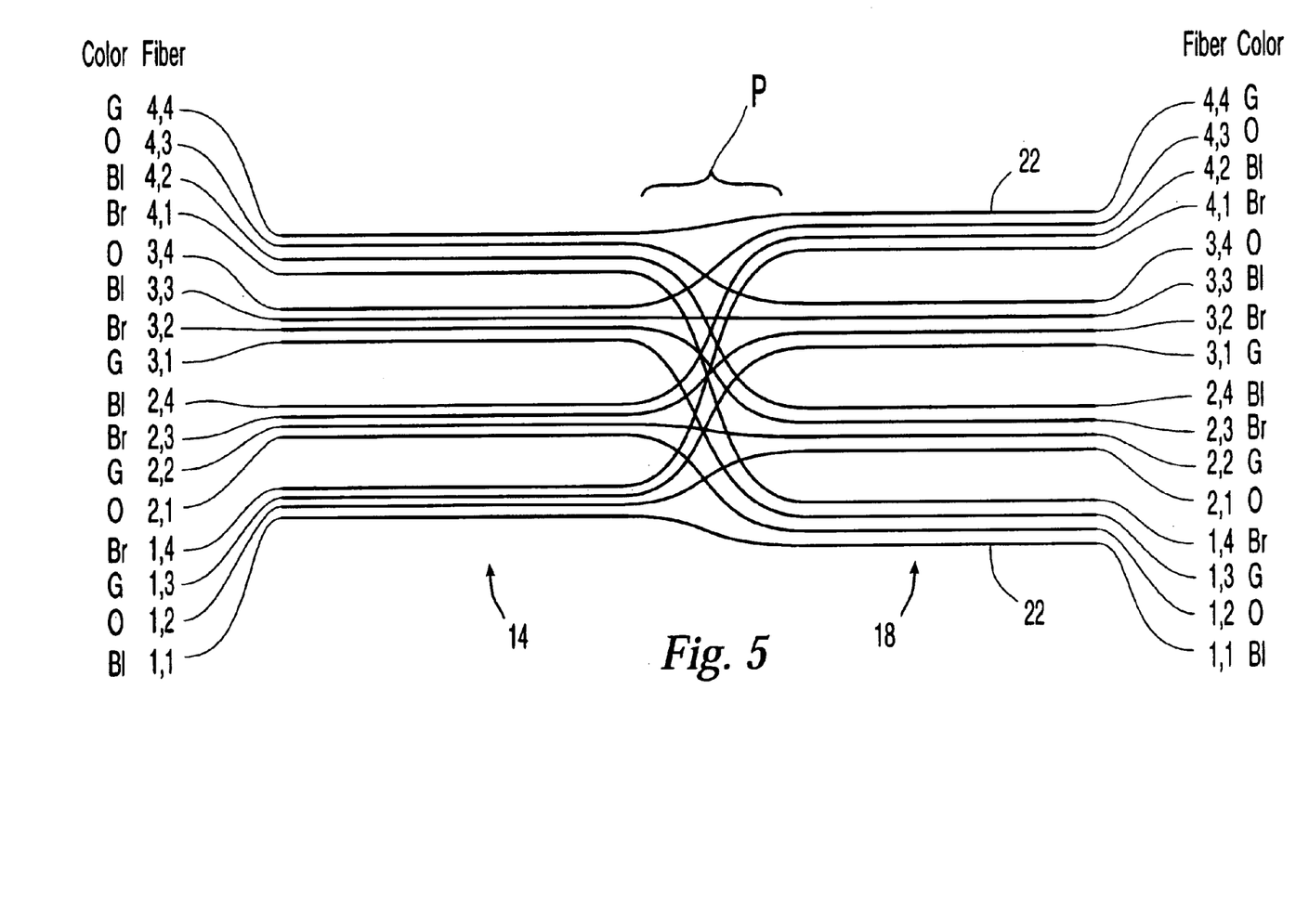
FIG. 5. is a schematic view of the routing scheme of optical fibers according to one embodiment of the present invention.
Figure 6:
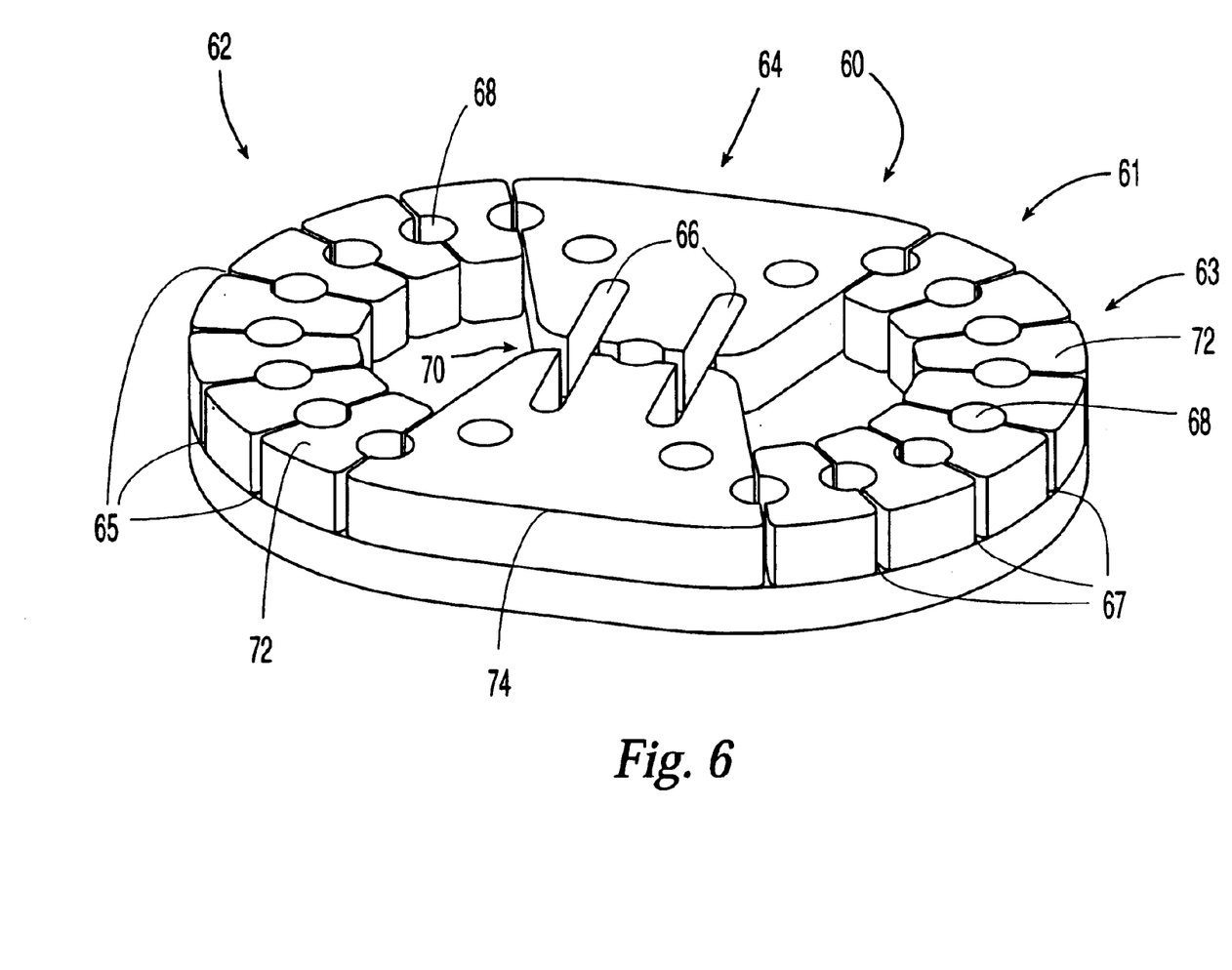
FIG. 6 is a perspective view of a fiber routing fixture according to one embodiment of the present invention.

The routing of the optical fibers 22 will now be explained with reference to FIG. 5. As explained briefly above, the flexible shuffle circuit schematically depicted in FIG. 5 is a 4×4 flexible shuffle circuit. There are four sets of optical fibers, each set containing four fibers. Typically, the fibers are identified by the number of the set and then the fiber within that set (set number, fiber number). For example, the second set's first fiber would be 2,1. Each of the optical fibers 22 is labeled in FIG. 5. Per convention, the first plurality of sets of optical fibers (usually the input) is on the left of the schematic and the second plurality of sets is on the right side, with the first set from each plurality on the bottom. Similarly, the colors of the fibers will follow the same convention. Hence, the lowest and thus the first fiber is blue, the second fiber is orange, the third fiber is green, and the fourth fiber is brown, continuing on as needed through the colors or other indicia. If more than twelve colors are needed, then typically a mark is added in the color/ink layer along the length of the optical fiber during the appropriate manufacturing step. In the second set or leg of optical fibers, the colors are rotated once so that the fiber in the first position has the identifying indicia of the second fiber—orange in the present embodiment. As a result, the second set has in the first position, the color that usually corresponds to the second fiber. Also, the fiber with the identifying indicia of the 1,1 fiber is moved to the last position in the second set, creating the rotation through the indicia as the operator moves through the sets of optical fibers. Obviously, if there are more optical fibers than there are sets of optical fibers, not all indicia will be in the first position and, if protective coverings are used, not all of the indicia used for the fibers will be used for the protective coverings. As a result of this rotation through the indicia on a first side, an operator can discern from the orientation of the optical fibers at their end portions, the identity of the sets of optical fibers. This allows an operator to discern a single fiber from as many as 144 fibers, without having to worry about labels that may fall or be cut off.

Reviewing the fiber identification labels adjacent each of the fibers in FIG. 5 reveals that while the colors in each of the similarly numbered sets on both sides of the shuffle point P are the same (the orientation of the indicia of the fibers in the first sets, for example, are the same on both sides—blue, orange, green, and then brown), the fibers are not the same. In fact, if the identification labels are reversed on one side, it will provide the identification of the optical fiber on the other side. For example, (1,4) on the right side of FIG. 5 is fiber (4,1) on the left side, in this embodiment.

The routing of the fibers will be explained in connection with the fiber routing fixture 60 shown in FIGS. 6–9. The fiber routing fixture 60 has a top surface 61, which has a first side 62 and a second side 63 that are separated by a central region 64. Each side has a plurality of passageways, passageways 65a–h on the first side 62 and passageways 67a–h on the second side 63, which allow an optical fiber to be routed therethrough. The illustrated fiber routing fixture 60 has eight passageways on either side 62,63, but it could have any number. In fact, a fixture with twelve passageways could be used to route up to twelve sets of optical fibers.

Figure 7:
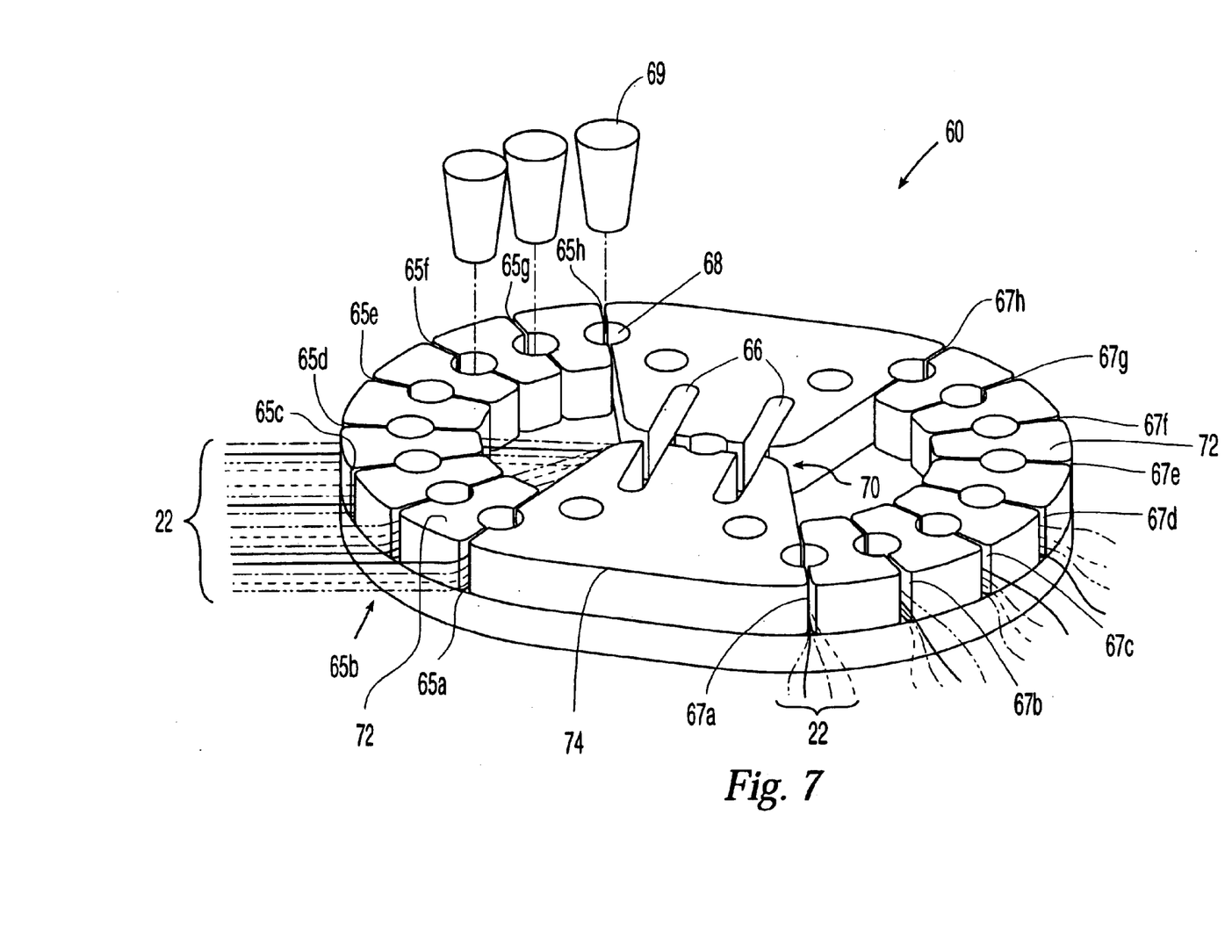
FIG. 7 is a perspective view of the fiber routing fixture of FIG. 6 showing optical fibers being routed therethrough.
Figure 8:
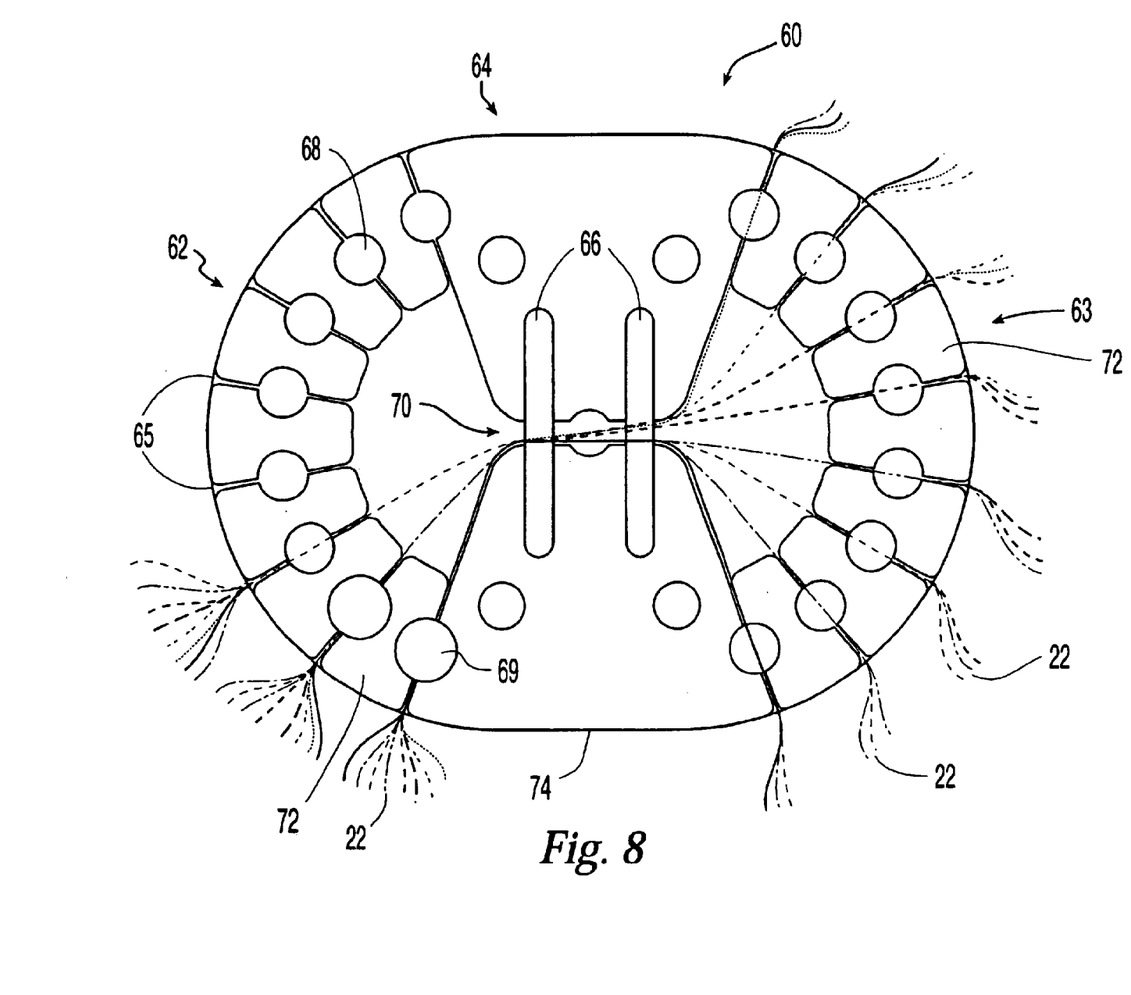
FIG. 8. is a top view of the fiber routing fixture showing the routing of optical fibers therethrough.

The central region 64 has a central passageway 70 to allow the optical fibers 22 to be routed from one side to the other. The passageways 65,67 are preferably identical on both sides, although it is not necessary. In order to keep the optical fibers 22 oriented as described in detail above, the passageways 65,67 are preferably slightly wider than one optical fiber, but they are not so wide so as to allow the optical fibers to fit side-by-side and slide past one another. The fiber routing fixture 60 also has at least one opening 66 passing through the fixture (see also FIGS. 8 & 9) in the central region 64 to allow an operator to grasp and secure the optical fibers from the top or the bottom after all fibers have been routed through the fiber routing fixture 60, but prior to removal therefrom. The fiber routing fixture 60 also has apertures 68 that straddle the passageways 65,67. As shown in FIG. 7, holding elements 69, which are preferably plugs, fit within the apertures 68 to keep the optical fibers within the passageways 65,67. This way, if the fiber routing fixture 60 is accidentally bumped or needs to be moved during the routing process, the optical fibers will not come out of the fiber routing fixture 60 easily. Due the to somewhat fragile nature of the optical fibers, the holding elements or plugs 69 are not intended to forcibly hold the fibers in the fiber routing fixture 60. Rather, they are intended to prevent the optical fibers from slipping out the fiber routing fixture 60. In fact, the optical fibers 22 could be pulled through the fiber routing fixture 60 without any resistance from holding elements 69. While holding elements 69 are shown to appear cork-like, any shape or configuration is possible as long as they prevent the optical fibers from slipping up and out of the passageways. Other holding elements are contemplated, for example, one or more rods, pins, clamps, vacuums, wadding or stuffing, stoppers, pads, latches, foam, and/or detents.

While the depicted embodiment of the fiber routing fixture 60 has a base member and individual elements 72,74 mounted thereon to make passageways 65,67,70, the entire fiber routing fixture 60 could be made of a unitary piece. It could be made of metal, plastic or any other suitable material.

To route the optical fibers 22 using the fiber routing fixture 60, a first fiber, which preferably has an indicia as discussed above, is routed through passageway 65a, through the passageway 70 in the central region 64, and through passageway 67a. A second fiber is then routed through passageway 65a (the second fiber would lie on top of the first fiber), through passageway 70 in the central region, and through passage way 67b, where it would be the first fiber. This procedure is performed for all of the fibers in the first set of optical fibers. When all of the fibers from the first set are routed through the fiber routing fixture 60, all of the fibers will be in one of the passageways 65 and only one fiber will be in each of the passageways 67 (67a–67h if eight fibers are routed). Then the second set is routed in a similar manner. A first optical fiber is routed through passageway 65b, through the passageway 70 in the central region, and finally through the passageway 67a, where it will become the second fiber therein. Again, it will lie on top of the fiber already present in the passageway. A second fiber will be routed through passageway 65b, through the passageway 70 in the central region, and finally through the passageway 67b, again where it will become the second fiber in the passageway 67b. This will continue until all fibers of all sets are routed.

Figure 9:
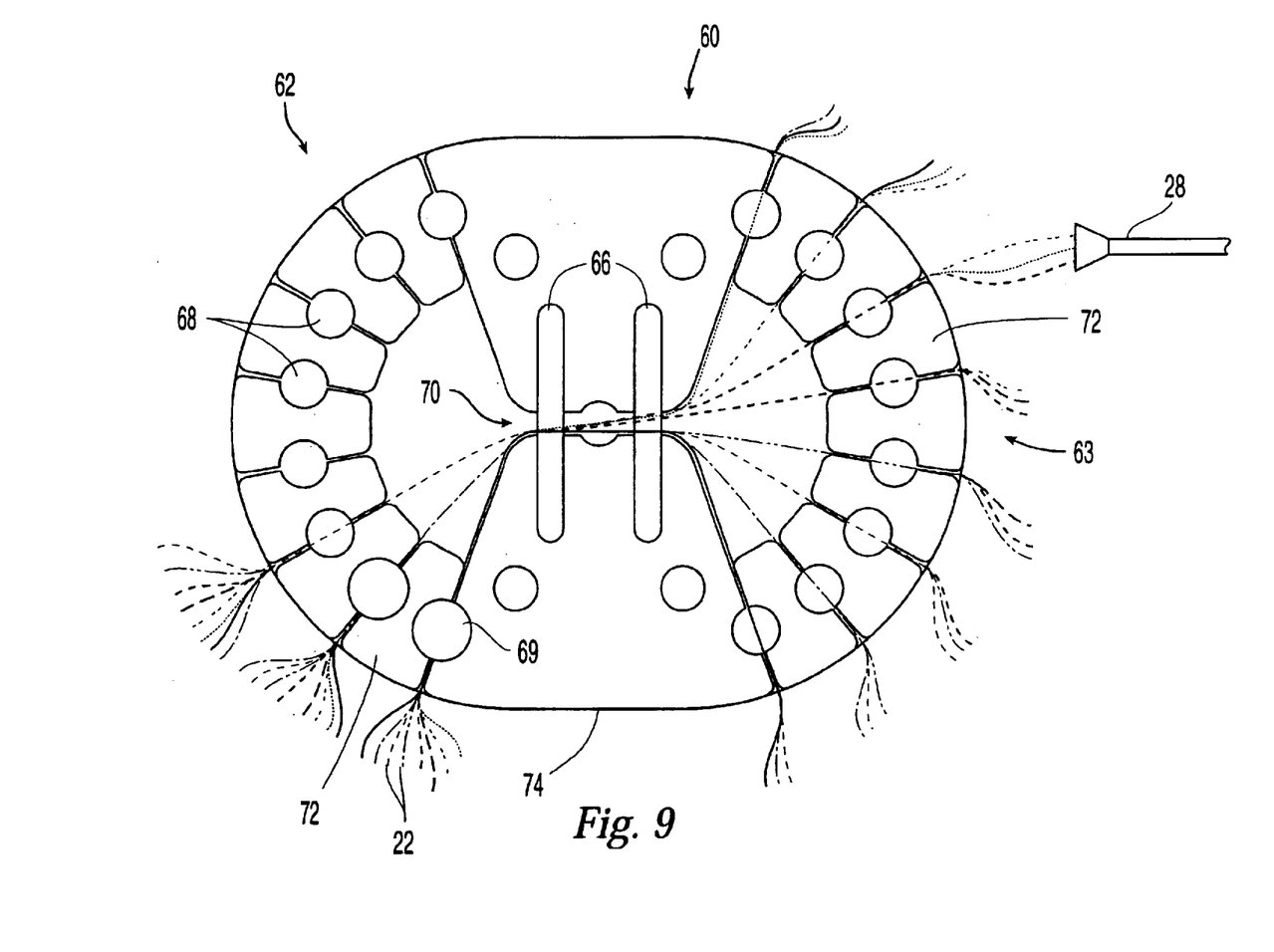
FIG. 9 is a top view of the routing fixture and optical fibers of FIG. 8 with a protective covering over some of the optical fibers.

If the sets of optical fibers are to have a protective covering 28 placed over the fibers, one can be slid over then ends of the optical fibers as shown in FIG. 9. The end portions of the optical fibers in each of the sets should be maintained in their routed orientation. A tie-wrap, rubber band, or other securing device can be inserted through opening 66 to hold all of the optical fibers 22 in place. The protective coverings 28, if they have been placed over each of the sets, will maintain the individual sets. As noted above, the protective coverings 28 may have an identifying indicia 34. A holding member is then used to maintain the shuffle point P. The holding member may be the housing 12,40, with or without the holding material 32, or the holding material 32 by itself. The optical fibers can then be ribbonized in their correct orientation by any appropriate method. Once ribbonized, the optical fibers can also be connectorized with any appropriate connector, the method of which is known. See FIG. 2.

It will be apparent to those skilled in the art that various modifications and variations can be made in the flexible shuffle circuit of the present invention without departing from the spirit or scope of the invention. Thus, it is intended that the present invention cover the modifications and variations of this invention provided they come within the scope of the appended claims and their equivalents.

We claim:

1. A fixture for routing optical fibers for a shuffle circuit comprising:

a first side;

a second side, the second side separated from the first side by a central region, the central region having a passageway for communication between the fist and second sides; and a plurality of passageways in each of the first and second sides for routing optical fibers, the passageways configured to maintain the optical fibers in a particular orientation;

wherein the plurality of passageways in the first and second sides are configured so that the optical fibers converge into the passageway of the central region and are collected together therein.

2. The fixture according to claim 1, further comprising holding elements configured to hold the optical fibers in the passageways.

3. The fixture according to claim 2, wherein the holding elements are plugs.

4. The fixture according to claim 1, wherein the fixture is configured to receive the holding elements.

5. The fixture according to claim 2, wherein the fixture has an aperture to receive the holding elements.

6. The fixture according to claim 1, wherein the passageways on each side form an arc.

7. The fixture according to claim 1, wherein the central region has an aperture therethrough to allow access to the optical fibers routed through the central region.

8. The fixture according to claim 1, wherein the fixture has a predetermined number of passageways on each of the first and the second sides.

9. The fixture according to claim 8, wherein the predetermined number of passageways is eight passageways.

10. The fixture according to claim 8, wherein the predetermined number of passageways is twelve passageways.

11. The fixture according to claim 8, wherein the predetermined number of passageways is not the same for the first and second sides.

12. A fixture for routing optical fibers for a shuffle circuit comprising:

a base member having a top surface;

a first side and a second side on the top surface separated by a central region, the central region having a passageway in communication with the first and second sides;

the first and second sides having a plurality of passageways for routing optical fibers, the passageways configured to maintain the optical fibers in a particular orientation;

wherein the plurality of passageways in the first and second sides are configured so that the optical fibers converse into the passageway of the central region and are collected together therein.

13. A fixture for routing optical fibers for a shuffle circuit comprising:

a first side;

a second side, the second side separated from the first side by a central region, the central region defining a passageway therethrough in communication with the first side and the second side; and a plurality of passageways in each of the first side and the second side for routing optical fibers, the plurality of passageways configured to receive holding elements for retaining the optical fibers in the passageways, the passageways defining an arc such that the optical fibers converge into the passageway defined by the central region.

* * * * *